Nov. 6, 1962  F. J. MACHOVEC  3,061,980
LAWN MOWER SHARPENER

Filed June 17, 1960  3 Sheets-Sheet 1

ALFRED J. MACHOVEC,
INVENTOR.

BY HIS ATTORNEYS.

HARRIS, KIECH, RUSSELL & KERN.

Nov. 6, 1962 F. J. MACHOVEC 3,061,980
LAWN MOWER SHARPENER
Filed June 17, 1960 3 Sheets-Sheet 2
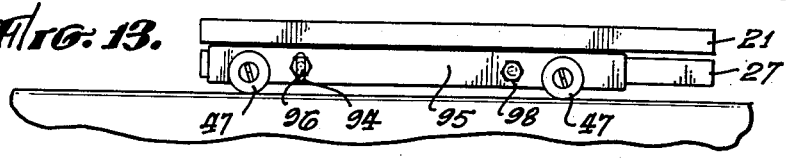
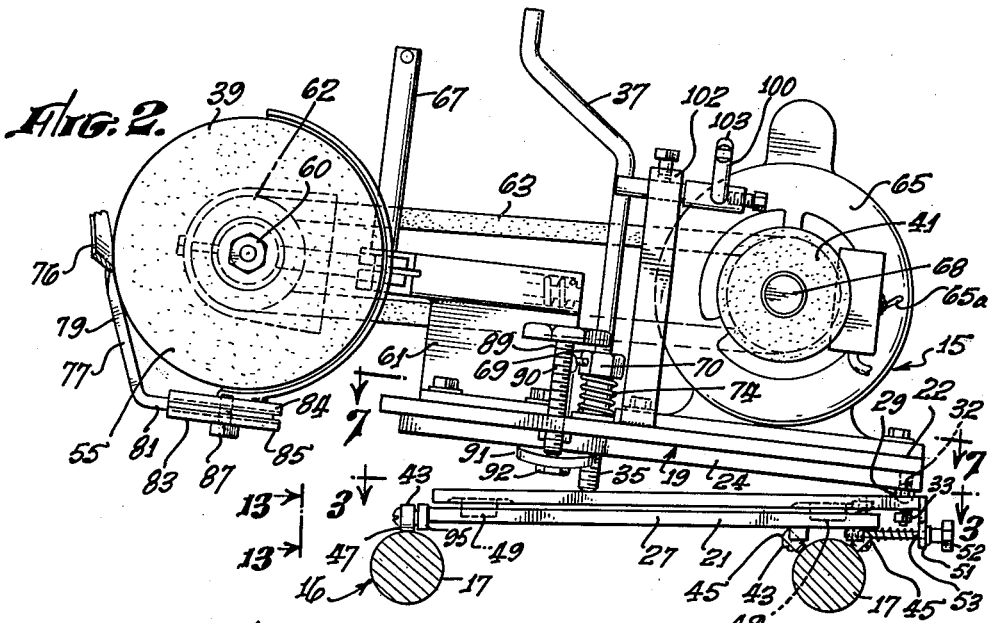
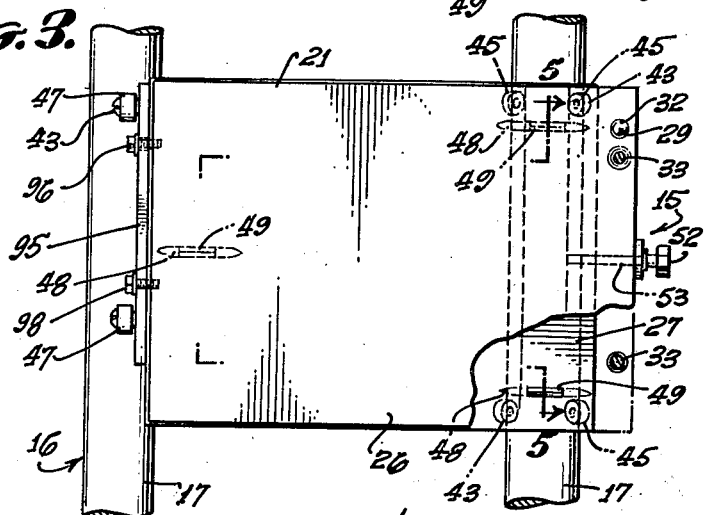
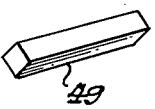
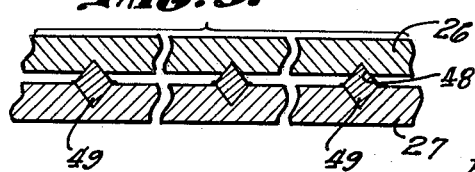
FRED J. MACHOVEC,
INVENTOR.
BY HIS ATTORNEYS
Harris, Kiech, Russell & Kern

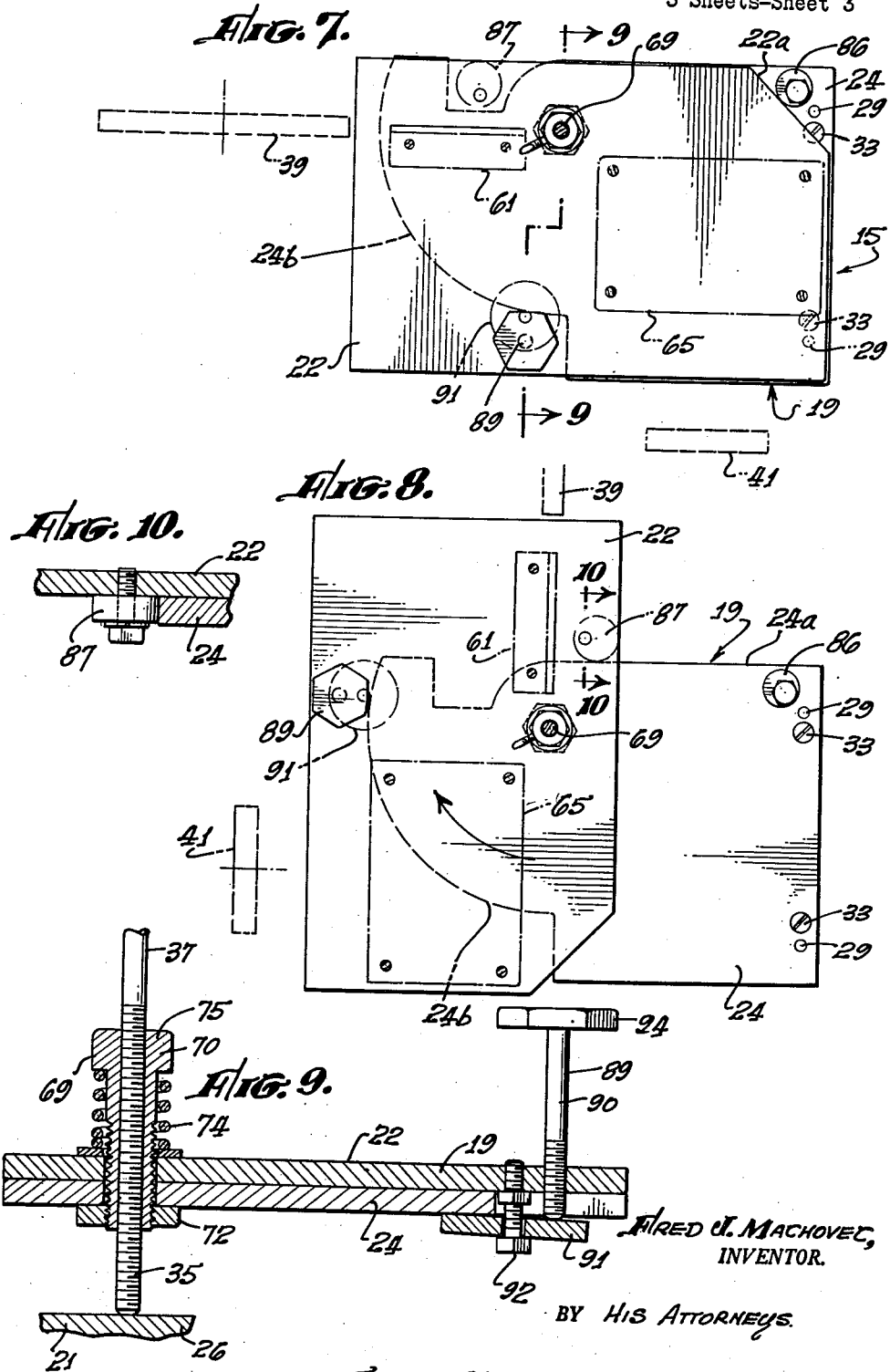

_United States Patent Office_

3,061,980
Patented Nov. 6, 1962

3,061,980
LAWN MOWER SHARPENER
Fred J. Machovec, Pasadena, Calif., assignor to Foley Manufacturing Company, Minneapolis, Minn., a corporation of Minnesota
Filed June 17, 1960, Ser. No. 36,895
8 Claims. (Cl. 51—48)

The present invention relates in general to lawn mower sharpeners and, more particularly, to a lawn mower sharpener of a general character disclosed in my Patent No. 2,879,629, granted March 31, 1959.

As general background, the lawn mower sharpener of the patent mentioned includes a suitable supporting structure, generally horizontal track means extending across the supporting structure, means carried by the structure for positioning a lawn mower to be sharpened alongside the track means, a carriage movable along the track means, and a grinding wheel mounted on the carriage and engageable with the lawn mower reel blade or bed knife being sharpened.

The carriage of the lawn mower sharpener includes an upper base on which the grinding wheel is mounted, and also an underlying lower base which supports the upper base and which includes track follower means in engagement with the track means. The upper base is pivotally mounted on the lower base in such a manner that the grinding wheel may be raised and lowered relative to the lawn mower positioning means by adjusting the angular position of the upper base relative to the underlying lower base. With this construction, the lawn mower positioning means and the upper base are adjusted relative to the supporting structure and the lower base, respectively, in such a manner as to properly position the grinding wheel relative to the lawn mower blade to be sharpened, whether this blade be a reel blade, a cutter bar knife, or the like. Means are also provided for moving the grinding wheel toward and away from the lawn mower positioning means without any change in the angular relationship between the grinding wheel and the blade being sharpened. The blade is then sharpened by moving the carriage along the track means with the grinding wheel in contact with the reel blade or knife until the grinding wheel has traversed the full length of the blade.

In the structure disclosed in my Patent No. 2,879,629, it is necessary to remove the bed knife from the lawn mower before sharpening either the bed knife or the blades of the reel. The structure disclosed in my copending application, Serial No. 743,555, filed June 23, 1958, now Patent No. 2,998,677, granted September 5, 1961, permits the sharpening of both the bed knife and the blades of the reel without first removing the bed knife from the lawn mower. The positioning structure disclosed in the copending application for supporting the lawn mower to be sharpened may be employed in the lawn mower sharpener of this application. The lawn mower positioning means is no part of this invention.

It is an object of this invention to provide a machine which may be adjusted to sharpen both right-hand and left-hand reels, as well as the cutter bar knife of nearly every form of lawn mower now commercially available. It is a further object of this invention to provide a lawn mower sharpener of simplified design.

It is an object of the invention to provide an improved lawn mower sharpener of the type permitting the sharpening of both the bed knife and the blades of the reel without removing the bed knife from the mower, wherein the movable carriage supported by the track means of the structure includes a first plate with an overlying second plate pivotally attached to it about an axis substantially vertical to the two plates. Both a reel blade grinding wheel and a bed knife grinding wheel are carried by the upper plate, along with a motor for powering the grinding wheels. Means is also provided for separately positioning the two grinding wheels in their respective operative positions upon pivoting of the overlying upper plate relative to the first plate of the carriage.

Another object is to provide a reel guide of an improved design which is adaptable to use with both left-handed and right-handed reels.

The foregoing objects, advantages, features, and results of the present invention, together with other objects, advantages, features, and results thereof which will be evident to those skilled in the lawn mower sharpening art in the light of the present disclosure, may be attained with the exemplary embodiment of the invention described in detail hereinafter and illustrated in the accompanying drawings, in which:

FIG. 2 is a side elevational view of the lawn mower sharpener of FIG. 1;

FIG. 3 is a plan view, partially cut away, of the lower base of the carriage with the upper base removed, taken along line 3—3 of FIG. 2;

FIG. 5 is a cross-sectional view, taken along line 5—5 of FIG. 3, illustrating the manner in which the upper plate is supported on the lower plate of the lower base of the carriage, by small slide pieces having a diamond cross section;

FIG. 6 is an isometric view of one of the slide pieces, illustrated in cross section in FIG. 5;

FIG. 7 is a plan view of the upper base of the carriage, taken along line 7—7 of FIG. 2, with the motor and grinding wheels removed therefrom;

FIG. 8 is another plan view of the upper base of the carriage with its upper plate pivoted approximately 90° with respect to the lower plate;

FIG. 9 is a cross-sectional view taken along line 9—9 of FIG. 7;

FIG. 10 is a fragmentary cross-sectional view taken along line 10—10 of FIG. 8;

FIG. 13 is a fragmentary side elevation taken from lines 13—13 of FIG. 2, illustrating in detail the manner in which the carriage is supported on the horizontal tracks of the supporting structure.

Figure 1:
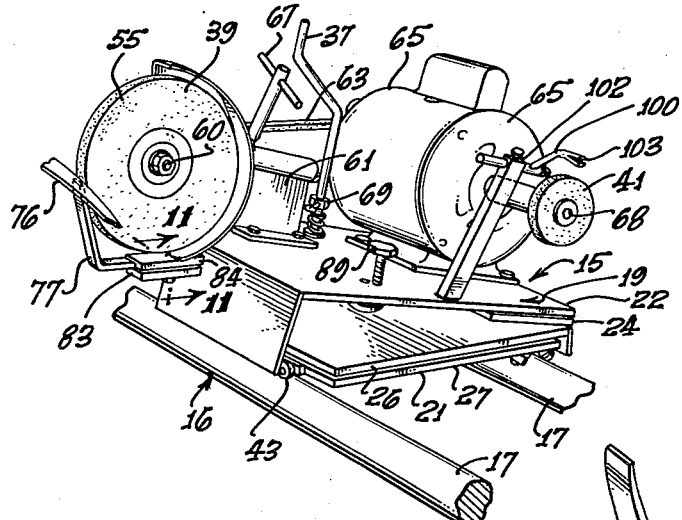
FIG. 1 is a fragmentary perspective view of the lawn mower sharpener of the invention illustrating the carriage supported on a pair of horizontal tracks, with the larger grinding wheel in its operative position in contact with a blade of a lawn mower reel.

In the drawings and in the description which follows, only those portions of the structure of the lawn mower sharpener of my prior patents and patent applications are disclosed which are necessary to an understanding of the improvements constituting the present invention. Consequently, reference is hereby made to the prior patents and applications for a complete disclosure of any portion of the lawn mower sharpener of the invention not specifically disclosed herein.

Referring particularly to FIG. 1 of the drawing, there is illustrated a carriage 15 carried by a track means 16 which preferably comprises two substantially parallel tracks 17 in the form of cylindrical rods, the axes of which are disposed in substantially the same horizontal plane. A lawn mower positioning means not shown is adjustable transversely of the tracks 17 to properly locate the lawn mower reel or the cutter bar relative to the tracks. Reference is hereby made to my aforementioned patent application Serial No. 743,555 for a more complete disclosure of the details and the manner in which the positioning means is adjusted and the manner in which the lawn mower is presented to the carriage, said structure, per se, forming no part of the present invention.

The carriage 15 is movable longitudinally of the two parallel tracks 17. The carriage is formed of an upper base 19 which is pivotally attached to a lower base 21. The upper base 19 of the carriage 15 is made up of an upper plate 22 which is pivotally connected to an immediately underlying lower plate 24, about an axis substantially perpendicular to the two plates. The lower base 21 is likewise formed of two plates 26 and 27. The upper base is pivotally mounted, as mentioned, on the lower base 21 formed by the two plates 26 and 27, or, more accurately, is pivotally mounted on the upper plate 26 of the lower base with the axis of the pivot being about a substantially horizontal axis which is parallel to the tracks 17. This pivotal connection between the upper base 19 and the upper plate 26 of the lower base 21 is provided by two balls 29 each seated in an opening 32 of the underface of the lower plate 24 of the upper base 19 and a registering opening 32 in the top surface of the upper plate 26 of the lower base 21. The upper and lower bases 19 and 21 are held in assembled relation by bolts 33 which extend through these carriage members on the pivot axis provided by the balls 29.

The angular position of the upper base 19 relative to the lower base 21 may be adjusted by means of a screw 35 threadedly connected to the upper base 19 and bearing against the upper plate 26 of the lower base 21, this screw 35 being provided with a crank 37 at its upper end. As will be apparent, by turning the crank 37, the angular position of the upper base 19 relative to the lower base 21 may be altered to vary the vertical position of either a larger grinding wheel 39 or a smaller grinding wheel 41 on the upper carriage base 19 so as to attain the desired angular relationship between either of the grinding wheels and the blade to be sharpened.

The carriage is slidably disposed along the two bars 17 by two spaced roller means 43 on each bar, the lower base 21 of the carriage 15 being supported on the guide bars 17 by a four-point suspension provided by six rollers, four of which are mounted on one guide bar and two of which are mounted on the other guide bar. Two of the four rollers 45, bear on one end of one of the bars 17 and the other two rollers bear on the other end thereof, these rollers having their axes approximately 30° from the vertical. The other two rollers 47, are spaced apart and bear on the other of the bars 17, providing with the four rollers 45 a four-point suspension, all as best seen in FIG. 3. The axes of rotation of the two rollers 47 is substantially horizontal.

As best seen in FIGS. 3, 5 and 6, the lower and upper plates of the lower base 21 are provided with three pairs of registering grooves 48 which extend transversely of the tracks 17, with each pair of grooves containing a slide member 49 of diamond shape cross section. As will be apparent, this construction permits movement of the grinding wheels 39 and 41 and their supporting upper base 19 toward and away from the lawn mower being sharpened, in a horizontal plane so as to avoid changing the angular relationship between the grinding wheels and the blade being sharpened. The upper plate 26 of the lower base 21 is moved relative to the lower plate 27 of the lower base 21 by an adjusting means 52 which includes a screw 53. The screw 53 is threadedly connected to the lower plate 27 and bears against a lug 51 on the upper plate 26. Turning of the adjusting means 52 moves one of the plates 26 and 27 relative to the other.

A reel blade grinding assembly 55 made up of the grinding wheel 39 is carried by a grinding wheel mount 61 which includes a sleeve 59 for a shaft 60 carrying the grinding wheel 39. This shaft also carries a driven pulley 62 around which there is trained an endless belt 63, the latter also being trained around a driving pulley of an electric motor 65 secured to the upper plate 22 of the upper base 19. The motor 65 is provided with a control switch 65a for starting and stopping. Reference is made to Patent No. 2,879,629 for a more complete disclosure of the details and the manner in which the grinding wheel assembly 55 is mounted to permit any desired angular positioning for the axis of rotation of the grinding wheel 39, this structure per se, forming no part of the present invention. A locking means 67 serves to lock the grinding wheel 39 in its various positions of orientation.

The smaller bed knife grinding wheel 41 is mounted on a shaft 68 of the motor 65. The axes of rotation of the two grinding wheels 39 and 41 are parallel to each other. The two abutting plates 22 and 24 making up the upper base 19 are held together by a bolt assembly 69 (see FIG. 9) which includes a bolt proper 70 which is hollow its full length. The bolt proper 70 is externally threaded and is threaded through both of the plates 22 and 24, carrying at its lower end a retaining nut 72. A compression spring 74 placed between the head 75 of the bolt 70 and the upper face of the upper plate 22 urges the two plates into contact with each other. The hollow bolt 70 is internally threaded to receive the aforementioned screw 35 of the positioning crank 37. Turning of the crank 37 lowers or elevates the upper base 19 with respect to the lower base 21 of the carriage 15.

Figure 12:
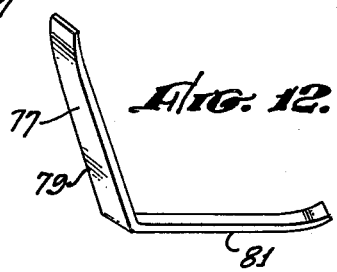
FIG. 12 is an isometric view of the reel guide removed from the lawn mower sharpener of the invention.

In the position shown in FIGS. 1 and 2 the larger wheel, the reel blade grinding wheel 39 is presented in its operative position in engagement with a reel blade 76. With the movement of the carriage 15 along the track 17, a reel blade guide 77 serves to bring succeeding portions of the reel blade 76 in contact with the turning grinding wheel 39. This guide, as best seen in FIG. 12, is a metal piece of a general V-shape, having a rectangular cross section. Each of the arms 79 and 81 of the V is slightly bent inwardly at its outer end to permit the grinding stone closer quarters to the work piece. Viewing arm 79 from the inside of the V, it will be seen that its outer end tapers downwardly from right to left. Arm 81 viewed from the same position tapers at its end in the opposite direction. The outer portion of the outside face of each of the arms 79 and 81 is preferably beveled from a full cross section to a somewhat reduced cross section to provide a blunt end. This outside beveling of the two arms is desirable in some instances as it permits the tool to clear the bed knife, where the bed knife is left in place during the grinding of the blades of the reel. The guide 77 is held by a mount 83 made up of two adjoining flat pieces 84 and 85 which have adjoining grooves 86 of a width suitable to receive the guide member 77. The two flat pieces 84 and 85 of the mount 83 are held together by a set screw 87. A reel blade guide of this design may accommodate both left and right-hand reels by simply interchanging the arm of the V presented to the reel.

The smaller grinding wheel 41 has associated with it a guide 100 carried by a mount 102 which guide 100 serves to prevent the reel from interfering with the sharpening of the bed knife. The guide 100 has a forked outer end 103 which holds the reel away from the grinding wheel 41.

Figure 4:
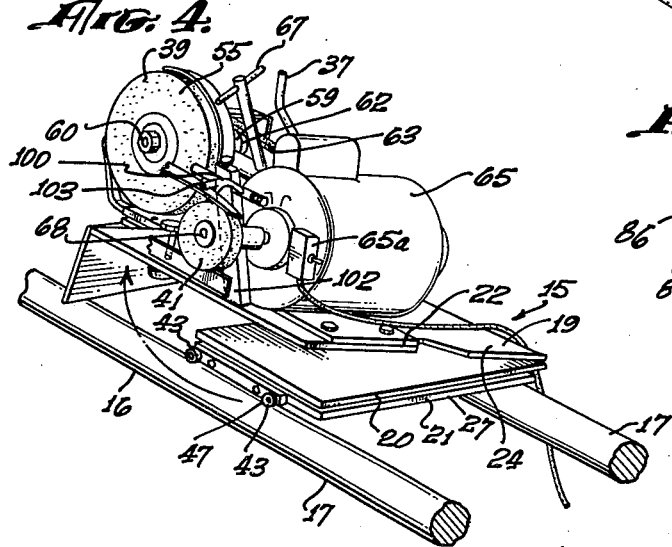
FIG. 4 is a fragmentary perspective view of the lawn mower sharpener of FIG. 1, with the smaller grinding wheel in its operative position in contact with the bed knife of a lawn mower.
Figure 11:
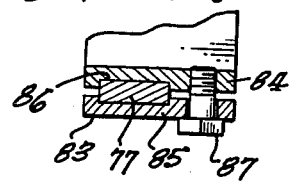
FIG. 11 is a cross-sectional view of the reel guide taken along line 11—11 of FIG. 1.

The two plates 22 and 24 of the upper base 19 are pivotally attached together by the aforementioned bolt assembly 69 and it is possible as illustrated in FIGS. 7 and 8 to move the two plates out of alignment into a second position with the upper plate disposed approximately 90° from its earlier position. When the two plates are aligned as in FIG. 7, the reel blade grinding wheel 39 is in its operative position (FIGS. 1 and 2). When the upper plate 22 is moved 90° away from the positions of FIG. 7, the smaller wheel 41 is moved into its operative position against a bed knife as illustrated in FIGS. 4 and 8.

Means are provided for separately positioning the two grinding wheels 39 and 41 in their respective operative positions upon the pivoting of the overlying plate 22 from one of the operative positions to the other operative position. This means for separately positioning the two grinding wheels 39 and 41 comprises stop means 87 and 86 carried by the respective plates 22 and 24 for engaging the side of the other to limit further movement. Each of the two stops 86 and 87 is an eccentrically mounted flat disc which presents a cam surface at its outer periphery. Altering the position of the cam surface provides for minor adjustments in the positioning of the respective grinding wheels in their operative positions. In FIG. 7, the cam stop 86 of the lower plate 24 engages edge 22a of a truncated corner of the upper plate 22 to position the grinding wheel 39 in its operative position. In FIG. 8, the stop 87 of the upper plate 22 contacts a side 24a of the lower plate 24 in a similar fashion.

A squeeze lock 89 (see FIG. 9) is provided for securing the two plates 22 and 24 together. This lock 89 is made up of a bolt 90 threaded through the upper plate 22, providing at its lower end a surface which engages a washer-like member 91. The washer member 91 is loosely held to the underside of the upper plate 22 by a bolt 92. The seating of the bolt 90 by turning of its handle 94 causes its lower end to bear against the upper surface of one side of the washer member 91, tilting its opposite side into engagement with the underside of the lower plate 24, providing a friction lock. Examination of FIG. 8 shows that the washer 91, with movement of the upper plate 22, at all times overhangs a curved edge 24b of the lower plate 24 so that seating of the bolt 90 will lock the two plates together.

In the lawn mower sharpener described in my earlier Patent No. 2,466,905, a three-point suspension is employed for supporting the carriage on the two parallel and longitudinal bars 17 of the supporting structure. This arrangement has not proven satisfactory with the pivotal two-member upper base construction of the present invention. In order to provide a level table with the lawn mower sharpener in both of its operative positions a four-point suspension is utilized. The exact structure preferably used is best seen in FIG. 13. The two spaced and aligned rollers 47 are carried by an elongated side member 95 which is held by bolts 96 and 98 to a side of the lower plate 27 of the lower base 21. Bolt 96 extends through an oversized hole or slot 94 of the side member 95. This oversized hole permits vertical adjustment of one of the wheels 47 to level the carriage 15. When the carriage 15 is at the desired position, the bolt 96 may be secured in place, locking the wheel 47 at the selected elevation. Once the leg height has been adjusted, the lawn mower sharpener may be used without further adjustment.

Although an exemplary embodiment of the present invention has been disclosed herein for the purposes of illustration, it will be understood that various changes, modifications, and substitutions may be incorporated in such embodiment without departing from the spirit of the invention as defined by the claims which follow.

I claim as my invention:

1. In a machine for sharpening lawn mowers having a reel blade and a bed knife, the combination of: a supporting structure carrying guide bars which extend across the structure; a carriage resting on said bars and movable longitudinally thereof, said carriage having an upper base pivotally attached about a horizontal axis to a lower base, with said upper base comprising a first plate and an overlying second plate in face-to-face engagement with the first plate and pivotally attached thereto about an axis substantially perpendicular to the two plates; a reel blade grinding wheel mounted on said second plate of the upper base of the carriage; a bed knife grinding wheel mounted on said second plate spaced from the reel blade grinding wheel with its axis of rotation parallel to that of the reel blade grinding wheel; power means for driving the two grinding wheels; means for separately positioning the two grinding wheels in their respective operative positions upon pivoting of said overlying second plate through an angle of approximately 90° from one of the operative positions to the other of said operative positions; and means for varying the angular distance between the upper and lower bases of the carriage by pivoting the upper base about said horizontal axis said means for varying the angular distance including a crank screw threadedly connected through the two plates of the upper base and extending along their vertical pivot axis, with the lower end of said crank screw engaging the upper face of the lower base of the carriage.

2. In a machine for sharpening lawn mowers having a reel blade and a bed knife, the combination of:
   a supporting structure carrying guide bars which extend across the structure;
   a carriage resting on said bars and movable longitudinally thereof, said carriage having an upper base pivotally attached about a horizontal axis to a lower base, with said upper base comprising a first plate and an overlying second plate in face-to-face engagement with the first plate and pivotally attached thereto about an axis substantially perpendicular to the two plates;
   a reel blade grinding wheel and a bed knife grinding wheel carried by said second plate of the upper base;
   means for powering said grinding wheels;
   means for separately positioning the two grinding wheels in their respective operative positions through pivoting of said overlying second plate relative to the first plate of the upper base; and
   means for varying the angular distance between the upper and lower bases of the carriage by pivoting the upper base about said horizontal axis.

3. A lawn mower sharpening machine in accordance with claim 2 wherein the means for varying the angular distance comprises a crank screw threadedly connected through the two plates of the upper base and extending along their vertical pivot axis, with the lower end of said crank screw engaging the upper face of the lower base of the carriage.

4. A lawn mower sharpening mechanism in accordance with claim 2 wherein the means for separately positioning two grinding wheels comprises a stop carried by each plate for engaging the side of the other plate to limit further movement; and
   means for locking the two plates together.

5. A lawn mower sharpening machine in accordance with claim 4 wherein each stop presents a movable cam surface to contact the side of said other plate, thus permitting, through movement of said cam surfaces minor adjustments in the positioning of the two grinding wheels in their respective operative positions.

6. In a machine for sharpening lawn mowers having a reel blade and a bed knife, the combination of:
   a supporting structure having two guide bars which extend across the structure;
   a carriage supported on each of the two guide bars by two spaced roller means, said carriage being movable longitudinally of the guide bars and including an upper base pivotally attached about a horizontal axis to a lower base, with said upper base comprising a first plate and an overlying second plate in face-to-face engagement with the first plate and pivotally attached thereto about an axis substantially perpendicular to the two plates;
   a reel blade grinding wheel and a bed knife grinding wheel carried by said second plate of the upper base of the carriage;
   means for powering said grinding wheels;

means for separately positioning the two grinding wheels in their respective operative positions upon pivoting of said overlying second plate relative to the first plate;

means for varying the angular distance between the upper and lower bases of the carriage by pivoting the upper base about said horizontal axis; and an adjusting means for raising and lowering one corner of the carriage with respect to one of said roller means.

7. A lawn mower sharpening machine in accordance with claim 6 wherein the two spaced roller means on one of the guide bars are each a single roller.

8. A lawn mower sharpening machine in accordance with claim 7 wherein the two spaced rollers are mounted on an elongated member which is fastened to one side of the carriage by two spaced bolts, with one of said bolts being retained in an oversized hole of the elongated member, thus permitting through location of the bolt within the oversized hole limited vertical adjustment of the carriage.

References Cited in the file of this patent

UNITED STATES PATENTS

| | | |
|---|---|---|
| 492,451 | Winkley | Feb. 28, 1893 |
| 584,457 | Brown | June 15, 1897 |
| 2,279,798 | Shelburne | Apr. 14, 1942 |
| 2,466,905 | Machovec | Apr. 12, 1949 |
| 2,633,675 | Ellis | Apr. 7, 1953 |
| 2,718,097 | Bradley | Sept. 20, 1955 |
| 2,777,258 | Avra | Jan. 15, 1957 |
| 2,879,629 | Machovec | Mar. 31, 1959 |